United States Patent [19]

Headen et al.

[11] 4,128,278
[45] Dec. 5, 1978

[54] LINEAR MOTION BALL BEARING WITH DYNAMIC STIFFNESS

[75] Inventors: William E. Headen, East Greenwich; George N. Levesque, Warwick, both of R.I.

[73] Assignee: Brown & Sharpe Manufacturing Company, North Kingstown, R.I.

[21] Appl. No.: 829,131

[22] Filed: Aug. 30, 1977

[51] Int. Cl.² .................................... F16C 17/00
[52] U.S. Cl. .................. 308/3 A; 308/6 C; 308/26; 308/184 R
[58] Field of Search ............. 308/6 C, 6 B, 6 R, 3 A, 308/3 R, 3 B, 73, 72, DIG. 13, 189, 74–75, 237, 238, 26, 184, 185, 28; 90/11 R, 15 R; 64/23, 23.7; 267/152

[56] References Cited

U.S. PATENT DOCUMENTS

| | | | |
|---|---|---|---|
| 3,545,826 | 12/1970 | Magee et al. | 308/6 C |
| 3,673,918 | 7/1972 | Zankl | 90/11 R |
| 3,777,616 | 12/1973 | Mueller | 308/6 R X |
| 3,893,732 | 7/1975 | McCloskey | 308/72 X |
| 4,005,913 | 2/1977 | Thomson, Jr. | 308/6 C |

*Primary Examiner*—Trygve M. Blix
*Assistant Examiner*—Douglas C. Butler
*Attorney, Agent, or Firm*—Barlow & Barlow

[57] ABSTRACT

A linear motion ball bearing assembly is provided for mounting within a housing and comprises a plurality of ball retainer members with a raceway therein. With the members surrounding a shaft, a load bearing plate is associated with the load bearing portion of each raceway and on the outer periphery of each raceway an elastomeric strip of material is mounted to resiliently restrain the movement of the ball bearing assembly in the spherical seat within the housing, and provide a high damping factor and exhibit high static stiffness.

3 Claims, 8 Drawing Figures

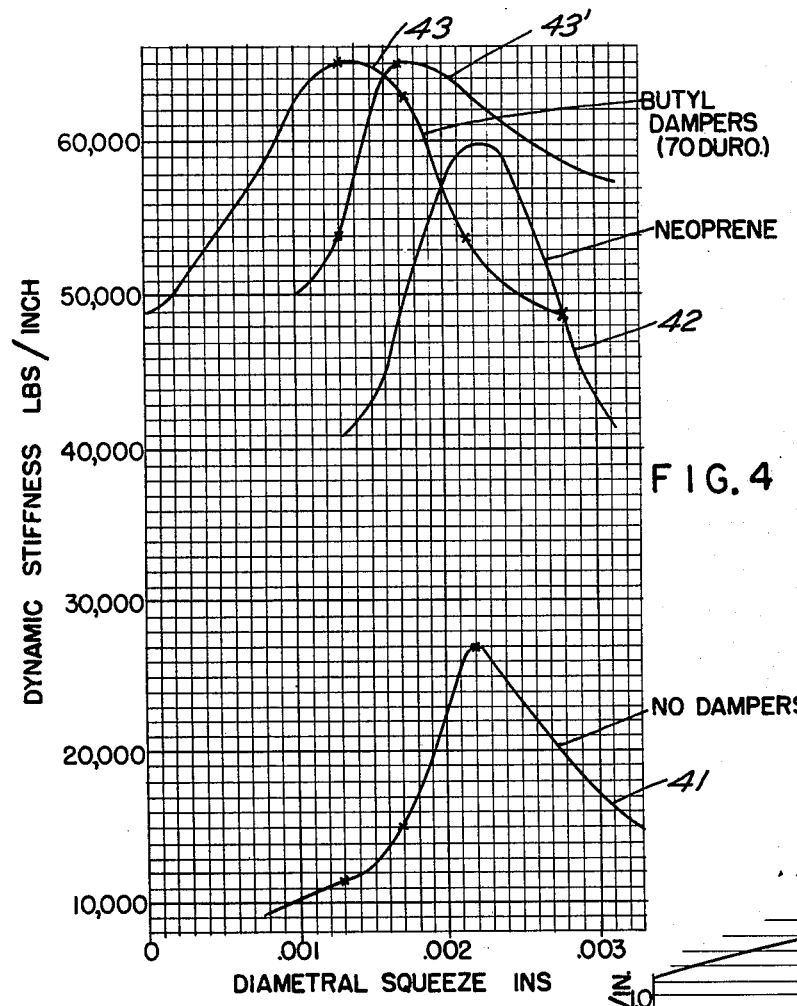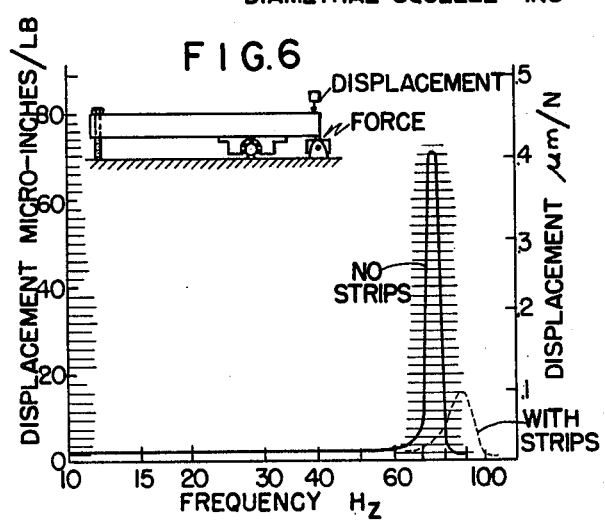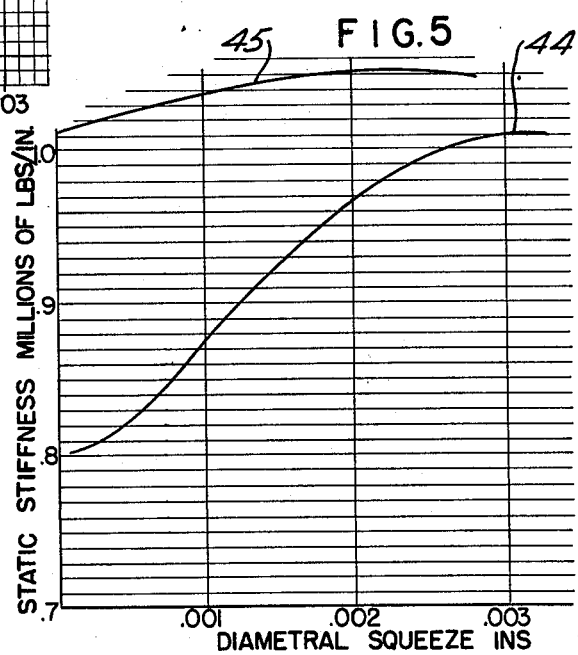

4,128,278

LINEAR MOTION BALL BEARING WITH DYNAMIC STIFFNESS

BACKGROUND OF THE INVENTION

There are many linear motion re-circulating ball bearing assemblies in the prior art. As an example in the Magee U.S. Pat. No. 3,545,826, there is described a self-aligning bearing which is particularly advantageous because it reduces the wear between the respective parts caused by binding of the shaft with respect to the balls. It is known that one of the primary causes of wear in linear ball bearing assemblies is related to the misalignment of the shaft with respect to the housing in which the linear bearing is placed. It is further known that linear motion recirculating ball bearings do not damp vibrations as well as conventional slideways. The self-alignment features are merely to reduce costs of manufacture particularly when multiple bushings are used to obtain high stiffness. A self-aligning bearing is disclosed in the McCloskey U.S. Pat. No. 3,893,732 which states that the resilient O-rings used for self-aligning may be sized to pre-load the bearing. No attempt, however, has been made to provide a successful damping or control of "radial deflection".

SUMMARY OF THE INVENTION

This invention provides a linear motion ball bearing assembly which is adapted for mounting within a housing that comprises basically a plurality of ball retainer members with a raceway therein which surround a shaft. A load bearing plate is attached to the load bearing portion of each raceway and on the radial outer surface of each load bearing plate is an elastomeric strip of material. The ball bushing has a diametral squeeze in the range of 0.0017 inch (0.043mm) to 0.0022 inch (0.056mm) which range is not too critical. The squeeze of the elastomeric strip is not critical and is on the order of 0.005 of an inch (0.13mm). A primary object of the present invention is to provide a linear motion ball bearing assembly which will accommodate dynamic misalignments and have a dampener system associated therewith which is preloaded between the load bearing plate and the housing and pillow block and which exhibits high static stiffness.

BRIEF DESCRIPTION OF THE DRAWINGS

FIG. 3A is a view similar to FIG. 3 in a loaded condition;

FIGS. 4, 5 and 6 are graphical representations of experimental results; and

DESCRIPTION OF THE PREFERRED EMBODIMENT

Figure 1:
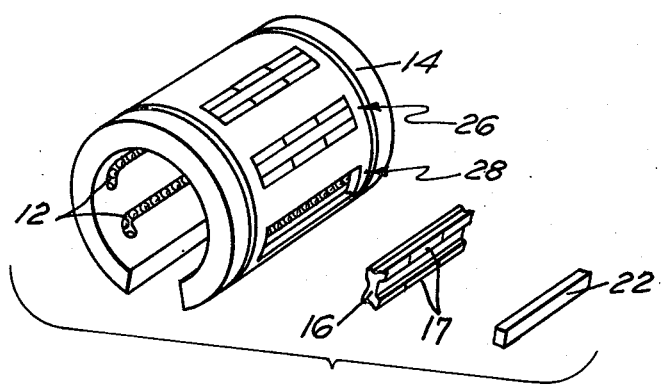
FIG. 1 is a detached perspective view of the bearing assembly of the invention.
Figure 3:
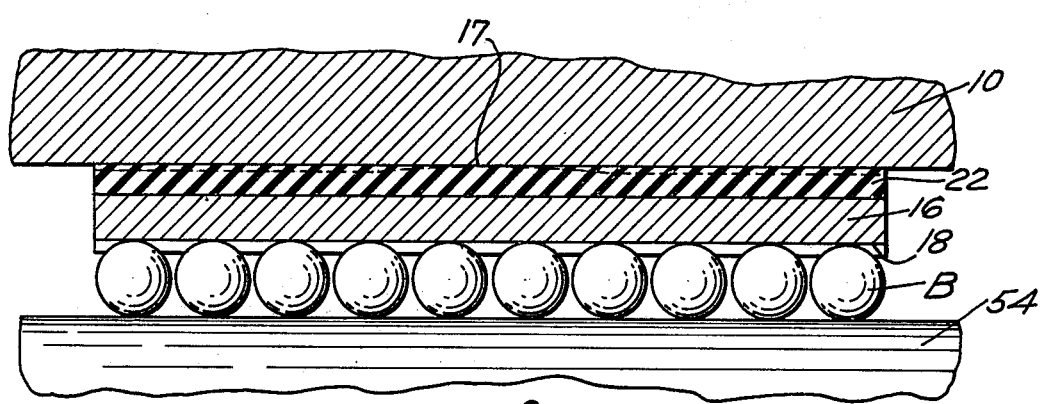
FIG. 3 is a longitudinal sectional view taken on line 3—3 of FIG. 2 in a no-load condition.
Figure 2:
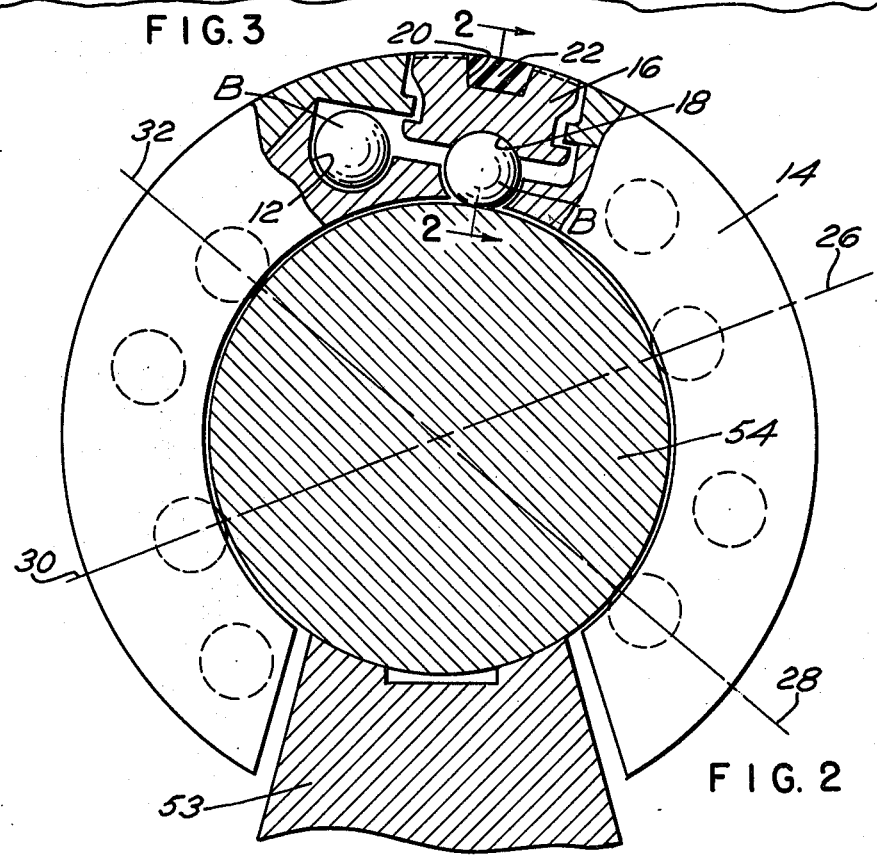
FIG. 2 is an end view partly in section of a linear motion ball bearing assembly.

Referring now to the drawings, the anti-friction ball bearing member which is more particularly described in the Magee patent 3,545,826 and to which reference is herein incorporated, provides a plurality of oblong raceways 12 located within an inner sleeve or ball retainer 14 that is received within a circular bore in housing 10. At particular points around the periphery of the retainer, there are provided load bearing plates 16 which are formed with a fulcrum or central portion 17 as seen in FIG. 3. The load bearing plates 16 each have a longitudinal raceway groove 18 therein which receive the balls such as B. The outer radial surface of this load bearing member 16 is provided with a recess 20 and within the recess 20 is a strip of elastomeric material 22. For convenience sake it must be understood that there will be similar load bearing plates around the housing and for example they may be located at positions as shown by broken lines at 26, 28, 30 and 32. It will be understood that each of the load bearing plates 16 is formed of hard metal and as seen in the drawings has an external longitudinal groove 20 therein in which elastomeric material 32 in the form of a strip is received. As disclosed in Magee Patent U.S. No. 3,545,826, the plate 16 has a fulcrum that contacts the housing, and as disclosed in Thomson Super Ball Bushing Catalog, page 8, the preload or "clearance" is controlled by the diameter of the housing or bearing internal diameter that includes all the physical dimensions of the balls, the plate, the shaft diameter, and the housing internal diameter. The assembly described is received about a cylindrical bar 54 mounted on a structural member 53. By referring specifically to FIG. 3 and FIG. 3A, it can be demonstrated that as the bearing plate 16 deflects slightly under changing loads, and the balls (see FIG. 3A) will actually deflect the elastomeric material 22 acts to resist this deflection which in turn causes significant damping to be added to the system. It has been found, for example, that there are some critical considerations to obtain optimum damping.

FIG. 4 is a plot of various diametral preloads versus dynamic stiffness represented in pounds per inch with various preloads or clearance indicated as diametral squeeze. As seen in FIG. 4, curve 41 represents a situation where there was no damping at all and a regular bearing was utilized. Curve 42 indicates the results obtained with a 70 durometer Black neoprene insert added to the structure. Curves 43,43' indicate results obtained with butyl inserts, which are defined as a 70 durometer (Shore scale A) Butyl stock No. X308. Compared to the original bare bushing the optimized assembly utilizing the butyl inserts represented by curves 43,43' has about seven times the damping and about 55% higher static stiffness. It should be understood that the X axis of the graph which we call preload is defined in terms of an increase of bar diameter over that bar which would just pick up additional rotational and sliding resistance. Further the test was conducted in an attempt to simulate conditions that bushings would normally experinece in machine tools. In machine tools the natural frequency approaches 70 hertz and in FIG. 5 the values for static stiffness are shown which were derived from measurements taken at low frequency inasmuch as the response of any system to a force applied at a frequency well below its natural frequency is the same as static force. It is apparent that the increase in dynamic stiffness from the no damping curve 44 to the Butyl damped curve 45 is dramatic and the increase in static stiffness, while not so dramatic, does show an increase.

From examining FIGS. 4 and 5, it will be apparent that there are certain optimum conditions to obtain the maximum dynamic damping of the bearing. For example, the preload or diametral interference on a normal ball bushing without elastomeric strip is crucial for optimizing the dynamic behavior of the bushing. Too much is as bad as too little. For example, the optimum interference on a two-inch (50mm) diameter bushing is 0.0022 inch (0.036mm). For a ball bushing fitted with the best elastomer damping strips this preload is less critical than that for an unmodified bushing; that is, one without the elastomeric strips since variations of + or − 0.0004 inch (0.01mm) only cause a 5% alteration in dynamic behavior. Results show that the optimum preload with elastomeric strip is between 0.0014 to 0.0022 inch.

It should be noted that in this particular construction the bearing plates 16 deflect under load so that there is nearly full relative motion of the bearing plate to pillow block at the center of the bearing plate 16, but, due to the deflection of the load bearing plates 16, there is very little relative motion of the bearing plate to pillow block at the end of the bearing plates. As a result, during radial deflection of the shaft, or motion perpendicular to the axis of the shaft, toward the pillow block or housing 10, the elastomeric strip is squeezed out toward the ends (see FIG. 3A) giving the desired shearing of the elastomeric material and resultant damping action.

In certain prior art and prior known constructions as, for example, the structure shown in U.S. Pat. No. 3,893,732, virtually all relative radial deflection between the shaft and the pillow block occurs at the ball bearing interfaces between the balls and the shaft and between the balls and the housing raceway. The deflection of the housing is very small due to the fact that the contact zone between the housing and pillow block is that of a sphere resting in a cylindrical bore of the same diameter. It can be shown that the contact deformations in this structure yield a very rigid structure compared to the connection between the shaft and the bearing balls, and while both in the instant invention and the U.S. Pat. No. 3,893,732 angular motion of the shaft to the housing is prevented, the significant difference is in radial deflection of the shaft relative to the housing.

This invention has found particular utility in linear ways systems in machine tools. It is known that vibratory forces cause chatter in machines where cutting tools are used as, for example, milling cutters, and this chatter produces minute flexing of the bearing races which is the energy that is being generated by the cutter against the stock. This energy is transmitted to the elastomer and the natural flexing of the elastomer will dissipate the energy. Thus, in a milling cutter, for example, utilizing ways which employ the invention, virtual freedom of chatter has been experienced when removing over 20 cubic inches per minute (325 cubic centimeters per minute) in steel. The dramatic results achieved are clearly illustrated in FIG. 6 in which a particular test setup was utilized by applying a force to the end of an 18-inch bar which had mounted ten inches from its fulcrum, a bearing constructed in accordance with the invention, which bearing had been preloaded with a diametral squeeze of 0.0017 inch (0.043mm). Here an oscillatory force of constant magnitude was applied at various frequencies and the amplitude of the force vibration was plotted as a function of frequency. It can readily be seen that this system was essentially a simple spring mass damper system which had a significant reduction of amplitude in the vibration by the utilization of the elastomeric strips.

Figure 7:
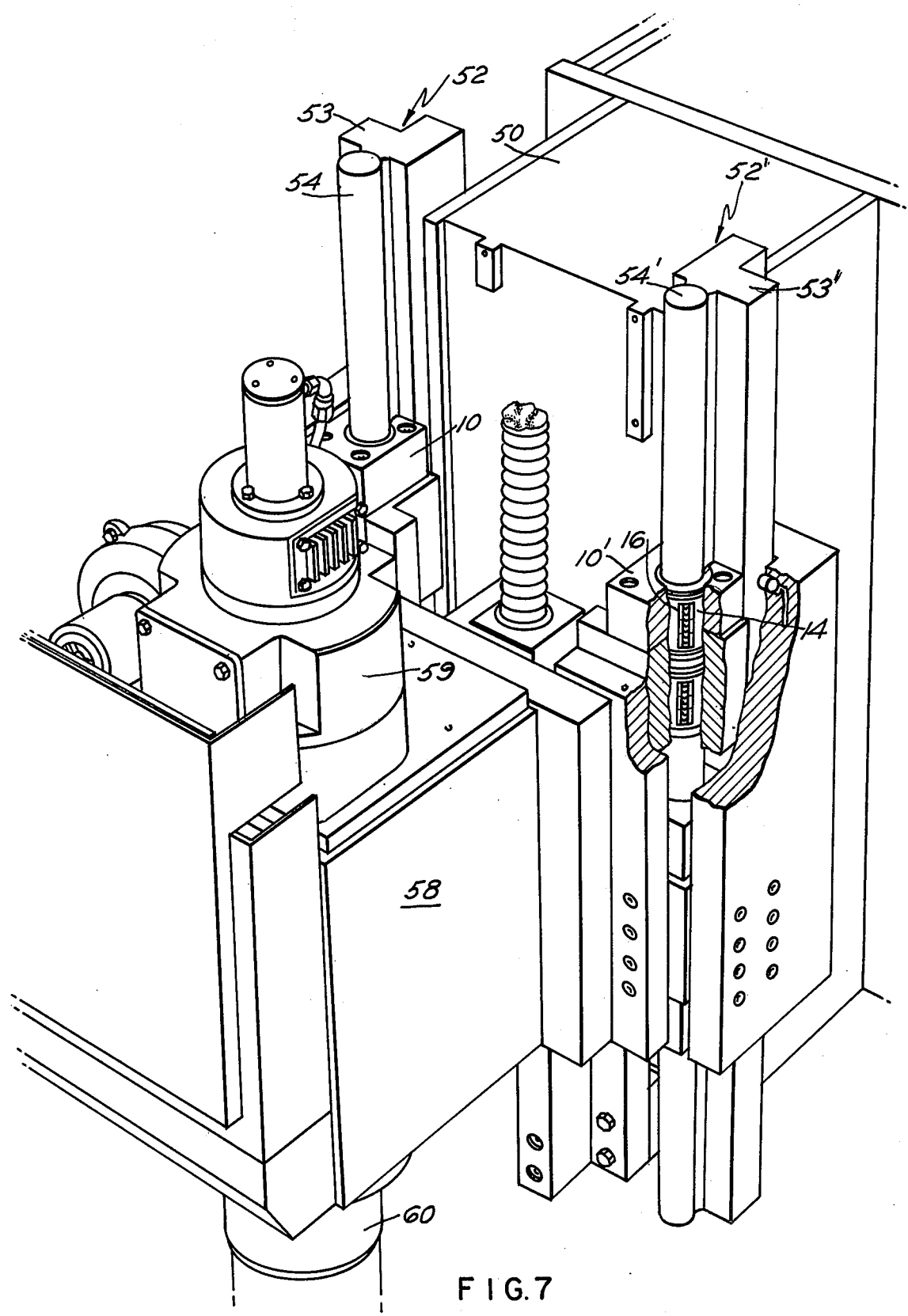
FIG. 7 is a perspective view, partly in section, of a machining column embodying the invention.

There is illustrated in the drawings FIG. 7, a typical application for the linear motion ball bearing constructed in accordance with this invention. To this end, there is shown a machining column 50 which has welded thereto a pair of ways 52,52'. Each way consists of a structural member 53, 53' to which a cylindrical bar 54, 54' is made integral. On the cylindrical way or bar 54 as can be seen in the broken-away portion, there is a ball retainer 14 which, as described, contains a plurality of circular raceways with balls therein and each of which has a load bearing plate 16. As understood, this ball retainer 14 is received in a pillow block or housing 10 and to the housing there is secured the spindle and drive housing 58 which contains a suitable drive motor such as 59 and a spindle 60 for mounting tooling.

We claim:

1. A linear motion ball bearing for axial movement along a shaft having a ball retainer member with a plurality of raceways therein, each raceway having recirculating ball bearing members therein comprising a load-bearing portion and a load-free portion, said member surrounding a shaft and being mounted in a housing having a cylindrical bore, a load bearing plate associated with the load bearing portion of each raceway, each load bearing plate having an intermediate thicker portion which contacts said housing, characterized in that a longitudinal strip of elastomeric material is mounted longitudinally in a recess of the outer peripheral surface of each load bearing plate, said strip and thicker portion of said load bearing plate contacting the bore of said housing, the balls being preloaded in the housing by contact of the thicker portion therewith with a diametrical squeeze factor of between 0.0017 and 0.0022 inch, the elastomeric material being squeezed on the order of 0.005 inch.

2. A ball bearing as in claim 1 wherein the elastomeric material has a durometer of approximately 70.

3. In a machine tool having cylindrical ways with a tooling spindle mounted in a drive housing, the drive housing having bearing housings attached thereto, the bearing housings being slidably received on said ways, the improvement comprising of a separate linear motion ball bearing held by said housings and each bearing surrounding its associated way, each bearing being mounted in said housings having a ball retainer member with a plurality of circular raceways therein, each raceway containing a plurality of ball bearing members and defining a load bearing portion and a load free portion, said member substantially surrounding said ways, and being retained in said bearing housing, a load bearing plate associated with load bearing portion of each raceway and having an intermediate thicker portion that contacts said bearing housing, a longitudinal strip of elastomeric material mounted on the load bearing plate between the plate and said housing, the thicker portion of said load bearing plate contacting the bore of said housing and the elastomeric material contacting both the housing and the load bearing plate, the ball being preloaded with a diametrical squeeze factor of between 0.0017 and 0.0022 inch and the elastomeric material being squeezed between the load bearing plate and the housing on the order of 0.005 inch.

* * * * *